United States Patent
Suzuki et al.

(10) Patent No.: US 8,920,705 B2
(45) Date of Patent: Dec. 30, 2014

(54) PROCESS FOR PRODUCING A POWDER OF ALUMINUM TITANATE-BASED CERAMICS

(75) Inventors: Keiichiro Suzuki, Niihama (JP); Masayuki Narumi, Niihama (JP)

(73) Assignee: Sumitomo Chemical Company, Limited, Tokyo (JP)

(*) Notice: Subject to any disclaimer, the term of this patent is extended or adjusted under 35 U.S.C. 154(b) by 937 days.

(21) Appl. No.: 13/119,661
(22) PCT Filed: Oct. 6, 2009
(86) PCT No.: PCT/JP2009/067388
§ 371 (c)(1), (2), (4) Date: Jun. 8, 2011
(87) PCT Pub. No.: WO2010/041648
PCT Pub. Date: Apr. 15, 2010

(65) Prior Publication Data
US 2011/0236688 A1    Sep. 29, 2011

(30) Foreign Application Priority Data
Oct. 7, 2008  (JP) .................................. 2008-260240

(51) Int. Cl.
C04B 35/478    (2006.01)
C01G 23/00    (2006.01)
C04B 35/626    (2006.01)

(52) U.S. Cl.
CPC ............ C01G 23/003 (2013.01); C04B 35/478 (2013.01); C04B 35/6262 (2013.01);
(Continued)

(58) Field of Classification Search
CPC ................................ C04B 35/478; C01P 4/61
USPC ........................................................ 501/136
See application file for complete search history.

(56) References Cited

U.S. PATENT DOCUMENTS 3,825,653 A * 7/1974 Duerksen et al. ............. 423/598
4,746,638 A * 5/1988 Hori et al. ..................... 501/127
(Continued)

FOREIGN PATENT DOCUMENTS

DE    29794 A1    9/1964
EP    1741684 A1    1/2007
(Continued)

OTHER PUBLICATIONS

Sturevant, Inc. NSP Powderizer. Hanover, MA: 1999.*
(Continued)

Primary Examiner — Joseph S Del Sole
Assistant Examiner — Russell Kemmerle, III
(74) Attorney, Agent, or Firm — Sughrue Mion, PLLC

(57) ABSTRACT

The invention is to provide a process of producing the powder of aluminum titanate-based ceramics in which the formation of fine particulate component and coarse particulate component is inhibited, and having a very sharp grain size distribution, efficiently and at good yield. The invention is a process for producing a powder of aluminum titanate-based ceramics, comprising a step of keeping a precursor mixture containing a titanium source powder, an aluminum source powder and a silicon source powder at a temperature range of from 1100° C. to 1350° C. for 3 hours or more, followed by a step of heating the precursor mixture up to 1400° C. or more and thereafter firing, at this temperature, the precursor mixture after the keeping to obtain a fired body of aluminum titanate-based ceramics, and a step of pulverizing and classifying the fired body of aluminum titanate-based ceramics, wherein the step of pulverizing and classifying the fired body of aluminum titanate-based ceramics comprises; a step (A) of pulverizing the fired body of aluminum titanate-based ceramics with the application of an impact and classifying the pulverized ceramics to obtain a powder of aluminum titanate-based ceramics having a prescribed grain diameter or less, and a step (B) of re-pulverizing the rest of the pulverized ceramics with the application of an impact and classifying the obtained pulverized ceramics to obtain a powder of aluminum titanate-based ceramics having a prescribed grain diameter or less.

12 Claims, 1 Drawing Sheet

(52) U.S. Cl.
CPC ......... *C01P 2004/54* (2013.01); *C01P 2004/61* (2013.01); *C01P 2004/62* (2013.01); *C04B 2235/3206* (2013.01); *C04B 2235/3222* (2013.01); *C04B 2235/3234* (2013.01); *C04B 2235/3418* (2013.01); *C04B 2235/3427* (2013.01); *C04B 2235/3463* (2013.01); *C04B 2235/3826* (2013.01); *C04B 2235/3852* (2013.01); *C04B 2235/3873* (2013.01); *C04B 2235/3886* (2013.01); *C04B 2235/401* (2013.01); *C04B 2235/402* (2013.01); *C04B 2235/404* (2013.01); *C04B 2235/441* (2013.01); *C04B 2235/442* (2013.01); *C04B 2235/443* (2013.01); *C04B 2235/444* (2013.01); *C04B 2235/446* (2013.01); *C04B 2235/447* (2013.01); *C04B 2235/448* (2013.01); *C04B 2235/449* (2013.01); *C04B 2235/5436* (2013.01); *C04B 2235/5481* (2013.01); *C04B 2235/6562* (2013.01)
USPC .......................................... 264/603; 501/136

(56) References Cited

U.S. PATENT DOCUMENTS

| | | | |
|---|---|---|---|
| 5,032,376 A * | 7/1991 | Kladnig | 423/598 |
| 5,055,434 A * | 10/1991 | Thometzek et al. | 501/127 |
| 5,055,435 A | 10/1991 | Hamanaka et al. | |
| 5,260,116 A | 11/1993 | Hamanaka et al. | |
| 6,197,248 B1 | 3/2001 | Fukuda et al. | |
| 6,403,019 B1 * | 6/2002 | Fukuda et al. | 264/658 |
| 7,294,164 B2 * | 11/2007 | Merkel | 55/523 |
| RE42,352 E | 5/2011 | Fukuda et al. | |
| 2006/0009347 A1 | 1/2006 | Fukuda et al. | |
| 2007/0224110 A1 * | 9/2007 | Fukuda et al. | 423/598 |
| 2008/0125305 A1 * | 5/2008 | Day et al. | 501/80 |
| 2010/0216634 A1 * | 8/2010 | Ohno et al. | 502/332 |
| 2010/0264568 A1 * | 10/2010 | Dunn et al. | 264/630 |
| 2012/0220445 A1 * | 8/2012 | Uoe et al. | 501/134 |
| 2012/0225768 A1 * | 9/2012 | Kono et al. | 501/1 |

FOREIGN PATENT DOCUMENTS

| | | |
|---|---|---|
| JP | 63-236759 A | 10/1988 |
| JP | 11-060240 A | 3/1999 |
| WO | 2004/039747 A1 | 5/2004 |
| WO | 2005/105704 A1 | 11/2005 |

OTHER PUBLICATIONS

First Office Action issued Dec. 3, 2012 in Chinese Patent Application No. 200980139744.9 to Sumitomo Chemical Co., Ltd., with translation.

European Search Report issued Apr. 5, 2013 in corresponding European Patent Application No. 09819182.8 to Sumitomo Chemical Co., Ltd.

* cited by examiner

PROCESS FOR PRODUCING A POWDER OF ALUMINUM TITANATE-BASED CERAMICS

CROSS REFERENCE TO RELATED APPLICATIONS

This application is a National Stage of International Application No. PCT/JP2009/067388 filed Oct. 6, 2009, which claims priority from Japanese Patent Application No. 2008-260240 filed Oct. 7, 2008, the contents of all of which are incorporated herein by reference in their entirety.

TECHNICAL FIELD

The present invention relates to a process for producing a powder of aluminum titanate-based ceramics, and precisely relates to a process for producing a powder of aluminum titanate-based ceramics by firing a precursor mixture containing a titanium source powder, an aluminum source powder, and a silicon source powder and pulverizing and classifying this.

BACKGROUND ART

Aluminum titanate is known as ceramics excellent in thermal resistance, and for example, Patent Reference 1 discloses a process comprising mixing a powdery titanium source and a powdery aluminum source, and firing the obtained precursor mixture. The aluminum titanate-based ceramics obtained by the process is generally a massive form and a powder may be obtained by pulverizing that. The obtained powder of aluminum titanate-based ceramics may be a shaped body by a method such as an extrusion molding after adding a liquid component such as water to make it clayey.

PRIOR ART REFERENCE

Patent Reference

Patent Reference 1: International Publication pamphlet of WO05/105704

DISCLOSURE OF THE INVENTION

Problems that the Invention is to Solve

However, an aluminum titanate-based ceramics is readily pulverized into fine particles in pulverizing, and therefore the powder of aluminum titanate-based ceramics obtained by pulverizing contains a large amount of a fine particulate component. Accordingly, the powder of aluminum titanate-based ceramics after pulverizing is generally used for shaping after removing fine particulate component and coarse particulate component by a classifying operation such as sieving.

The removed fine particulate component is known to block up the pores of a shaped ceramics body obtained in a production of an extrusion-molded article. The coarse particulate component may clog an extruder, and there is a problem that a shaped article having a thin wall could not be obtained from the coarse particulate component. Accordingly, the removed fine particulate component and coarse particulate component of a powder of aluminum titanate-based ceramics could not be used for shaping directly as such, and all go to waste in actual condition.

An object of the invention is to provide a process by which the formation of fine particulate component and coarse particulate component is inhibited, and a powder of aluminum titanate-based ceramics having a very sharp grain size distribution can be produced efficiently and at good yield.

Means for Solving the Problems

The invention provides a process for producing a powder of aluminum titanate-based ceramics, comprising a step of keeping a precursor mixture containing a titanium source powder, an aluminum source powder and a silicon source powder at a temperature range of from 1100° C. to 1350° C. for 3 hours or more, followed by a step of heating the precursor mixture up to a temperature of 1400° C. or more and thereafter firing, at this temperature, the precursor mixture after the keeping to obtain a fired body of aluminum titanate-based ceramics, and a step of pulverizing and classifying the fired body of aluminum titanate-based ceramics, wherein the step of pulverizing and classifying the fired body of aluminum titanate-based ceramics comprises; a step (A) of pulverizing the fired body of aluminum titanate-based ceramics with the application of an impact and classifying the pulverized ceramics to obtain a powder of aluminum titanate-based ceramics having a prescribed grain diameter or less, and a step (B) of re-pulverizing the rest of the pulverized ceramics with the application of an impact and classifying the obtained pulverized ceramics to obtain a powder of aluminum titanate-based ceramics having a prescribed grain diameter or less. In the invention, the step (B) is preferably repeated twice or more.

When the step (B) is repeated twice or more, "the rest of the pulverized ceramics" in the step (B) of the second round or later may be read as "the rest of the pulverized ceramics obtained by classifying in the previous-round step (B)".

In the process of the invention, the step (A) and the step (B) are preferably carried out continuously by immediately classifying and discharging the powder of aluminum titanate-based ceramics having a prescribed grain diameter or less obtained by the pulverizing out of a pulverizing area and at the same time, continuing pulverizing of the rest of the pulverized ceramics existing in the pulverizing area. And the step of pulverizing and classifying is preferably carried out by using a pulverizing machine with a built-in classifying machinery.

The powder of aluminum titanate-based ceramics having a prescribed grain diameter or less obtained in the step (A) and the step (B) is preferably a powder of aluminum titanate-based ceramics having a maximum grain diameter of 110 μm or less. And preferably, the precursor mixture further contains a magnesium source powder.

The titania-equivalent amount of the titanium source powder to be used is preferably 20 parts by mass or more and 60 parts by mass or less relative to 100 parts by mass of the total of the titania-equivalent amount of the titanium source powder to be used, the alumina-equivalent amount of the aluminum source powder to be used, and the magnesia-equivalent amount of the magnesium source powder to be used. Moreover the alumina-equivalent amount of the aluminum source powder to be used is preferably 30 parts by mass or more and 70 parts by mass or less relative to 100 parts by mass of the total of the titania-equivalent amount of the titanium source powder to be used, the alumina-equivalent amount of the aluminum source powder to be used, and the magnesia-equivalent amount of the magnesium source powder to be used. Further, the magnesia-equivalent amount of the magnesium source powder to be used is preferably 0.1 parts by mass or more and 10 parts by mass or less relative to 100 parts by mass of the total of the titania-equivalent amount of the titanium source powder to be used, the alumina-equivalent amount of the aluminum source powder to be used, and the magnesia-equivalent amount of the magnesium source powder to be used.

The invention also includes a powder of aluminum titanate-based ceramics obtained by any one of above-mentioned processes. In the powder of aluminum titanate-based ceramics, it is preferable that a content of fine particulate component having a grain diameter of 10 μm or less is 20% by volume or less and a content of coarse particulate component having a grain diameter of 70 μm or more is less than 10% by volume.

Effect of the Invention

In the invention, a powder of aluminum titanate-based ceramics having a very sharp grain size distribution containing neither fine particulate component nor coarse particulate component can be produced efficiently. Specifically, by the production process of the invention, the formation of an unsuitable component as a powder for shaping such as fine particulate component and coarse particulate component is inhibited, and a powder of aluminum titanate-based ceramics having a suitable grain size distribution as a powder for shaping can be produced at good yield.

MODE FOR CARRYING OUT THE INVENTION

Figure 1:
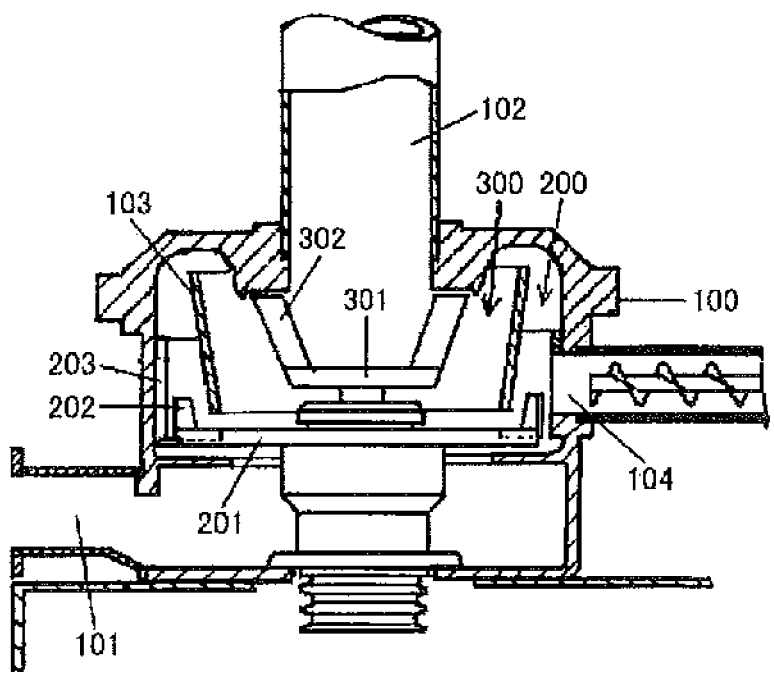
FIG. 1 is a rough sectional drawing indicating an example of a pulverizing apparatus with a built-in classifying machinery used preferably in the invention.

The production process of the powder of aluminum titanate-based ceramics in the invention includes the following step.

(1) A step of keeping a precursor mixture containing a titanium source powder, an aluminum source powder and a silicon source powder at a temperature range of from 1100° C. to 1350° C. for 3 hours or more (named the keeping step).

(2) A step of heating the precursor mixture up to a temperature of 1400° C. or more and thereafter firing, at this temperature, the precursor mixture after the keeping to obtain a fired body of aluminum titanate-based ceramics (named the firing step).

(3) A step of pulverizing and classifying the fired body of aluminum titanate-based ceramics (named the pulverizing and classifying step).

(1) The Keeping Step

In this step, a precursor mixture containing a titanium source powder, an aluminum source powder and a silicon source powder is kept at a temperature range of from 1100° C. to 1350° C. for 3 hours or more. The precursor mixture may be obtained by mixing a titanium source powder, an aluminum source powder, and a silicon source powder. The precursor mixture is led to aluminum titanate-based ceramics by firing.

A titanium source powder constituting the precursor mixture is a powder of a material that will become a titanium component constituting aluminum titanate-based ceramics. The material includes, for example, a powder of titanium oxide. Titanium oxide includes, for example, titanium(IV) oxide, titanium(III) oxide, and titanium(II) oxide, and titanium(IV) oxide is preferably used. Titanium(IV) oxide may be crystalline or amorphous. When titanium(IV) oxide is crystalline, the crystal type thereof includes an anatase type, a rutile type, and a brookite type, and an anatase type and a rutile type are preferable.

The titanium source powder to be used in the invention may be a powder of a material capable of being led to titania (titanium oxide) by firing in air. The material includes, for example, titanium salt, titanium alkoxide, titanium hydroxide, titanium nitride, titanium sulfide, and titanium.

The titanium salt particularly includes titanium trichloride, titanium tetrachloride, titanium(IV) sulfide, titanium(VI) sulfide, and titanium(IV) sulfate. The titanium alkoxide particularly includes titanium(IV) ethoxide, titanium(IV) methoxide, titanium(IV) tert-butoxide, titanium(IV) isobutoxide, titanium(IV) n-propoxide, titanium(IV) tetraisopropoxide, and their chelate compounds.

A powder of titanium oxide is preferably used as the titanium source powder, and a powder of titanium(IV) oxide is further preferable.

The aluminum source powder is a powder of a material that will become an aluminum component constituting aluminum titanate-based ceramics, and includes, for example, a powder of alumina (aluminum oxide). The alumina may be crystalline or amorphous. When the alumina is crystalline, the crystal form thereof includes a γ form, a δ form, a θ form, and a α form, and an α-type alumina is preferably used.

The aluminum source powder to be used in the invention may be a powder of a material capable of being led to alumina by firing in air. The material includes, for example, aluminum salt, aluminum alkoxide, aluminum hydroxide, and aluminum metal.

The aluminum salt may be a salt with an inorganic acid (inorganic salt), or a salt with an organic acid (organic salt). The aluminum inorganic salt particularly includes, for example, nitrates such as aluminum nitrate, ammonium aluminum nitrate; and carbonates such as ammonium aluminum carbonate. The aluminum organic salt includes, for example, aluminum oxalate, aluminum acetate, aluminum stearate, aluminum lactate, and aluminum laurate.

The aluminum alkoxide particularly includes, for example, aluminum isopropoxide, aluminum ethoxide, aluminum sec-butoxide, and aluminum tert-butoxide.

Aluminum hydroxide may be crystalline or amorphous. When aluminum hydroxide is crystalline, the crystal type thereof includes, for example, a gibbsite type, a bayerite type, a norstrandite type, a boehmite type, and a pseudo-boehmite type. Amorphous aluminum hydroxide includes, for example, an aluminum hydrolyzate obtained by hydrolysis of an aqueous solution of a water-soluble aluminum compound such as aluminum salt, and aluminum alkoxide.

An alumina powder is preferably used as the aluminum source powder, and an α-type alumina powder is further preferable.

The silicon source powder is a powder of a material contained in aluminum titanate-based ceramics as a silicon component, and includes, for example, a powder of silicon oxide (silica) such as silicon dioxide, and silicon monoxide.

The silicon source powder to be used in the invention may be a powder of a material capable of being led to silica by firing in air. The material includes, for example, silicic acid, silicon carbide, silicon nitride, silicon sulfide, silicon tetrachloride, silicon acetate, sodium silicate, sodium orthosilicate, and glass frit, and glass frit is preferable in terms of easiness of industrial availability.

Glass frit means a flake or a powder of glass obtained by melting raw material mixture consisting of quartz sand, feldspar, lime, and the like and cooling the melted material rapidly.

A powder of a material that serves as both a silicon source and an aluminum source may be used as the silicon source powder. The material includes, for example, feldspar such as alkali feldspar.

The precursor mixture may contain a magnesium source powder, and in this case aluminum magnesium titanate may be obtained as aluminum titanate-based ceramics. The magnesium source powder is a powder of a material that will become a magnesium component constituting aluminum titanate-based ceramics, and includes, for example, a powder of magnesia (magnesium oxide).

The magnesium source powder may be a powder of a material capable of being led to magnesia by firing in air. The material includes, for example, magnesium salt, magnesium alkoxide, magnesium hydroxide, magnesium nitride, and magnesium metal.

The magnesium salt particularly includes magnesium chloride, magnesium perchlorate, magnesium phosphate, magnesium pyrophosphate, magnesium oxalate, magnesium nitrate, magnesium carbonate, magnesium acetate, magnesium sulfate, magnesium citrate, magnesium lactate, magnesium stearate, magnesium salicylate, magnesium myristate, magnesium gluconate, magnesium dimethacrylate, and magnesium benzoate.

The magnesium alkoxide particularly includes magnesium methoxide, and magnesium ethoxide.

A powder of a material that serves as both a magnesium source and an aluminum source may be used as the magnesium source powder. The material includes, for example, magnesia spinel [$MgAl_2O_4$].

The amount of the titanium source powder to be used, the amount of the aluminum source powder to be used, the amount of the magnesium source powder to be used and the amount of the silicon source powder to be used are determined on the basis of the calculated result in terms of the amount of titania [$TiO_2$], the amount of alumina [$Al_2O_3$], the amount of magnesia [MgO] and the amount of silica [$SiO_2$] containing the same amount of Ti, Al, Mg or Si as that of Ti, Al, Mg, or Si contained in the respective powders. The titania-equivalent amount of the titanium source powder to be used is generally from 20 parts by mass to 60 parts by mass relative to 100 parts by mass of the total of the titania-equivalent amount of the titanium source powder to be used, the alumina-equivalent amount of the aluminum source powder to be used, and the magnesia-equivalent amount of the magnesium source powder to be used (hereinafter referred to as the total amount of titania.alumina.magnesia), and is preferably from 30 parts by mass to 50 parts by mass. The alumina-equivalent amount of the aluminum source powder to be used is generally from 30 parts by mass to 70 parts by mass relative to 100 parts by mass of the total amount of titania.alumina.magnesia, and is preferably from 40 parts by mass to 60 parts by mass. The silica-equivalent amount of the silicon source powder to be used is generally from 0.1 parts by mass to 20 parts by mass relative to 100 parts by mass of the total amount of titania.alumina.magnesia, and is preferably from one part by mass to 10 parts by mass. The magnesia-equivalent amount of the magnesium source powder to be used is generally from 0.1 parts by mass to 10 parts by mass relative to 100 parts by mass of the total amount of titania.alumina.magnesia, and is preferably from 0.5 parts by mass to 5 parts by mass.

The precursor mixture can be obtained, for example, by mixing the titanium source powder, the aluminum source powder, the silicon source powder, and the optionally-used magnesium source powder. The mixing may be carried out either in a dry condition, or in a wet condition. The order of the mixing is not specifically limited, and these starting material powders may be mixed at the same time.

In the mixing, the starting material powder is generally mixed by pulverizing and stirring with a pulverizing media in a pulverizing container. As the pulverizing container, a container made of metal material such as stainless steel is generally used, and its inner surface may be coated with a fluororesin, a silicone resin, an urethane resin and the like. Examples of the pulverizing media include alumina beads and zirconia beads having a grain diameter of from 1 mm to 100 mm, preferably from 5 mm to 50 mm.

Stirring may be carried out, for example, by vibrating, or rotating the pulverizing container into which the starting material powder and pulverizing media are added. By vibrating or rotating the pulverizing container, the starting material powder is stirred and mixed with the pulverizing media and is pulverized. For vibrating or rotating the pulverizing container, for example, an ordinary pulverizing machine such as a vibration mill, a ball mill, and a planetary mill may be used, and a vibration mill is preferably used from the viewpoint of easiness of operation in industrial scale. The mixing may be carried out by continuous process or by batch process, and continuous process is preferred from the viewpoint of easiness of operation in industrial scale. The time to be taken for mixing and pulverizing is generally from one minute to 6 hours, preferably from 1.5 minutes to 2 hours.

In mixing and pulverizing, additives such as a dispersant, a pulverizing aid, and a deflocculant may be added. The pulverizing aid includes, for example, monohydric alcohols such as methanol, ethanol, and propanol; dihydric alcohols such as propylene glycol, polypropylene glycol, and ethylene glycol; amines such as triethanolamine; higher fatty acids such as palmitic acid, stearic acid, and oleic acid; carbon materials such as carbon black, and graphite. These are used either singly or in combination with each other.

When the additives are used, the total amount to be used may be generally from 0.1 parts by mass to 10 parts by mass, preferably from 0.5 parts by mass to 5 parts by mass, more preferably from 0.75 parts by mass to 2 parts by mass, relative to 100 parts by mass of the total amount of the starting material powder to be used, that is the total amount to be used of the titanium source powder, the aluminum source powder, the silicon source powder, and the magnesium source powder.

When the additives are used, the additives may be removed from the precursor mixture after mixing depending on the property of the additives. For example, the additives may be removed by heating and burning down in air. The heating temperature is generally 500° C. or less.

In the keeping step, the above-mentioned precursor mixture is kept at a temperature range of from 1100° C. to 1350° C. for 3 hours or more. By firing after the keeping step, a dense fired body of aluminum titanate-based ceramics can be obtained, accordingly a formation of fine particulate component can be inhibited in the pulverizing of a fired body of aluminum titanate-based ceramics.

The reason of keeping the precursor mixture at a temperature range of from 1100° C. to 1350° C. is to produce aluminum titanate-based ceramics having a small coefficient of thermal expansion at a firing temperature of lower than 1500° C.

The precursor mixture (the mixture of the titanium source powder, the aluminum source powder, the silicon source powder, and the optionally-added magnesium source powder) may be heated up to a temperature range of from 1100° C. to 1350° C. and kept at the temperature range in a powder form, the shaped body obtained by shaping the precursor mixture may be kept at the temperature range. The shaping method of the precursor mixture includes ordinary methods, such as a method of pressing in a shaping mold using a uniaxial pressing, a tabletter and the like; a method of shaping with a granulator, an extruder and the like and drying after adding liquid component such as water to the precursor mixture.

The time of keeping the precursor mixture at temperature in the range of from 1100° C. to 1350° C. is 3 hours or more, preferably 4 hours or more, and further preferably 6 hours or more. The time of keeping is generally 24 hours or less. During the keeping at a temperature range of from 1100° C. to 1350° C., the precursor mixture may be kept at a constant temperature, or may be heated gradually, or may be cooled down gradually, or may be alternately heated and cooled repeatedly, unless the temperature goes beyond the range. The heating rate or the cooling rate in the case of heating or cooling is generally 100° C./hour or less, preferably 80° C./hour or less, further preferably 50° C./hour, from the viewpoint of easiness of keeping the precursor mixture at the temperature range.

The atmosphere in heating up to the temperature range and keeping at the temperature range is generally an air. The atmosphere may be an inert gas, such as nitrogen gas, and argon gas; or a reducing gas, such as carbon monoxide, and hydrogen gas, depending on the type or the amount ratio to be used of the starting material powder to be used, that is the titanium source powder, the aluminum source powder, silicon source powder, and the magnesium source powder. The heating and keeping may be carried out in the atmosphere in which the water vapor partial pressure is reduced.

The heating up to and keeping at the temperature range is generally carried out using an ordinary heating furnace, such as a tubular electric furnace, a boxy electric furnace, a tunnel furnace, a far-IR furnace, a microwave heating furnace, a shaft furnace, a reverberating furnace, a rotary furnace, and a roller hearth furnace.

(2) The Firing Step

In this step, the precursor mixture after the keeping step is heated up to a temperature of 1400° C. or more and generally lower than 1500° C., and is fired at the temperature to obtain a fired body of aluminum titanate-based ceramics. The firing is generally carried out by heating the precursor mixture up to the firing temperature subsequent to the keeping step, and in the same atmosphere as that of the keeping step, and using the same heating furnace as that of the keeping step.

The time to be taken for the firing may be a time enough for the transition of the precursor mixture after the keeping step into aluminum titanate-based ceramics, and is generally from 10 minutes to 24 hours, depending on the amount of the precursor mixture, the type of the firing furnace, the firing temperature, and the firing atmosphere.

The fired body of aluminum titanate-based ceramics can be obtained through the steps described above. The fired body of aluminum titanate-based ceramics is generally massive, when the precursor mixture is fired in a powder form. When the shaped body of the precursor mixture is fired, the shape of the shaped body just after shaping is kept almost completely.

(3) The Pulverizing and Classifying Step

In this step, the fired body of aluminum titanate-based ceramics is pulverized and classified to obtain a powder of aluminum titanate-based ceramics. In the process of the invention, the pulverizing and classifying step comprises the following steps.

(A) the step of pulverizing the fired body of aluminum titanate-based ceramics with an application of an impact, and classifying the pulverized ceramics to obtain a powder of aluminum titanate-based ceramics having a prescribed grain diameter or less, and (B) the step of re-pulverizing the rest of the pulverized ceramics with an application of an impact and classifying the obtained pulverized ceramics to obtain a powder of aluminum titanate-based ceramics having a prescribed grain diameter or less.

The mixture of the powders of aluminum titanate-based ceramics having a prescribed grain diameter or less obtained in the steps (A) and (B) is the intended powder of aluminum titanate-based ceramics. By pulverizing and classifying comprising the steps (A) and (B), only a component having a prescribed grain diameter or less may be screened and collected, and therefore, a powder of aluminum titanate-based ceramics containing no coarse particulate component can be obtained. Moreover, by re-pulverizing and re-classifying in the step (B), the coarse particulate component in the step (A) is pulverized to have a prescribed grain diameter or less and collected, and therefore, the formation of a coarse grain component unsuitable as a powder for shaping can be highly inhibited. In the invention, it is preferable that the step (B) is repeated twice or more. The larger the repeat count of the step (B) is, the more the yield of the intended powder of aluminum titanate-based ceramics increases, and the more amount of the finally remaining coarse particulate component can be reduced.

When the step (B) is repeated twice or more, "the rest of the pulverized ceramics" in the step (B) of the second round or later is read as "the rest of the pulverized ceramics obtained by classifying in the previous-round step (B)".

In this step, the step (A) and the step (B) are preferably carried out continuously by immediately classifying and discharging the powder of aluminum titanate-based ceramics having a prescribed grain diameter or less obtained by the pulverizing out of a pulverizing area and at the same time, continuing pulverizing of the rest of the pulverized ceramics existing in the pulverizing area. When the fine powder produced by pulverizing stays in the pulverizing area, then the powder may have some negative influence on the later pulverizing; but on the contrary, when the powder of aluminum titanate-based ceramics having a prescribed grain diameter or less produced by pulverizing is immediately discharged out of the pulverizing area, then the subsequent pulverizing of the rest of the pulverized ceramics can be carried out efficiently.

The fired body of aluminum titanate-based ceramics which is obtained through the keeping step and the firing step and served to the pulverizing-classifying step is the material with a high density, therefore fine particulate component is hard to form even if the fired body is pulverized and classified. Thus, according to the production process of the present invention, a powder of aluminum titanate-based ceramics containing neither fine particulate component nor coarse particulate component, and having a sharp grain size distribution can be obtained.

The powder of aluminum titanate-based ceramics having a prescribed grain diameter or less collected in the steps (A) and (B) preferably has a maximum grain diameter of 110 μm or less, taking easiness of shaping of the powder of aluminum titanate-based ceramics and quality of a shaped article of the invention into consideration.

A pulverizing apparatus with a built-in classifying machinery as shown in FIG. 1 is preferably used as a pulverizing-classifying apparatus for carrying out the above-mentioned step (A) and step (B). The pulverizing apparatus shown in FIG. 1 comprises a main body 100 having a gas introduction port 101 in the lower part thereof and having a gas and powder discharge port 102 in the upper part thereof. The inside of the main body 100 is divided into an outer pulverizing area 200 and an inner classification area 300 by a cylindrical body 103. The main body 100 is provided with an inlet port 104 which communicates with the pulverizing area 200 and through which a substance to be a subject for pulverizing and classifying is supplied.

The pulverizing area 200 is provided with a pulverizing rotor 201, and the rotor 201 is equipped with pulverizing hammers 202 at the edge thereof. More specifically, multiple pulverizing hammers 202 are fitted to the outer peripheral part of the pulverizing rotor 201, and are spaced from the liner 203 formed on the inner wall of the pulverizing area 200. The pulverizing rotor 201 is rotatable around the center axis thereof. The pulverizing area 200 communicates with the gas introduction port 101 in the lower part thereof.

The gas stream from the gas introduction port 101 carries the powder pulverized in the pulverizing area 200 into the classification area 300. In the classification area 300, the powder is classified into a fine powder and a coarse powder and only the fine powder is allowed to pass. The classification area 300 communicates with the discharge port 102. The classification area 300 is provided with classifying machinery that comprises a classifying rotor 301 rotatable around the center axis, and multiple classification fans 302 installed to stand on the outer peripheral part of the classification rotor 301, for example, at an inclination angle of about 6 degrees. The classifying machinery is disposed so that only the classified fine powder can pass thorough the machinery and can be discharged out through the discharge port 102.

In pulverizing and classifying of the fired body of aluminum titanate-based ceramics using the pulverizing apparatus, the fired body of aluminum titanate-based ceramics put into the apparatus through the inlet port 104 is first introduced into the pulverizing area 200 and pulverized. The pulverizing may be carried out by rotating the pulverizing rotor 201 and giving impact by the pulverizing hammers 202. Through the gas introduction port 101, a gas such as an air or an inert gas is introduced into the inside of the main body 100, and the gas flows toward the discharge port 102 after passing from the bottom of the pulverizing area 200 to the bottom of the classification area 300 and crossing the classification fans 302. Or the gas flows toward the discharge port 102 after passing from the bottom of the pulverizing area 200 to the outer side of the classification area 300, then flowing from the upper part to the lower part of the classification area 300 and crossing the classification fans 302. Accordingly, the pulverized powder flows into the classification area 300 with the gas. In the classification area 300, the pulverized powder is separated into a fine powder and a coarse powder by using the difference between the current force of the gas running from the classification area 300 toward the discharge port 102 and the centrifugal force given by the classification rotor 301. Specifically, the current force is more effective to the fine powder, and a fine powder is able to pass over the classification fans 302, and is discharged out from the discharge port 102 and collected. On the other hand, the centrifugal force is more effective to the coarse powder, and a coarse powder does not pass over the classification fans 302 but returns back to the pulverizing area 200 from the lower part of the cylindrical body 103. The coarse powder returning back to the pulverizing area 200 is re-pulverized and then re-classified in the classification area 300. In this apparatus, the pulverizing and classifying operation can be repeated.

One example of the pulverizing apparatus having the constitution shown in FIG. 1 is ACM Pulverizer manufactured by Hosokawa Micron (e.g., ACM Pulverizer ACM-10), which can be preferably applied to the invention.

The powder of aluminum titanate-based ceramics obtained in the invention has a sharp grain size distribution containing neither a fine particulate component nor a coarse particulate component. Specifically, for example, the powder of aluminum titanate-based ceramics obtained in the invention has a content of a fine particulate component having a grain diameter of 10 µm or less is 20% by volume or less, preferably 10% by volume or less, and a content of a coarse particulate component having a grain diameter of 70 µm or more is less than 10% by volume, preferably less than 5% by volume The median grain diameter (median diameter) of the aluminum titanate-based ceramics powder obtained in the invention is preferably 20 µm or more, and the maximum grain diameter is preferably 110 µm or less.

The grain diameter characteristics (grain diameter distribution, median grain diameter and maximum grain diameter) of the powder of aluminum titanate-based ceramics can be controlled by adjusting the condition in the keeping step (keeping time, keeping temperature and the like), the number of rotations of the pulverizing rotor and the classification rotor in the pulverizing apparatus with a built-in classifying machinery, and the flow rate of gas in the apparatus and the like.

Since the powder of aluminum titanate-based ceramics obtained in the invention has a sharp grain size distribution containing neither a fine particulate component nor a coarse particulate component, it can be preferably applied as a material for a ceramics shaped body. Examples of the ceramics shaped body include tools for firing furnaces such as crucibles, setters, saggers, and refractories; filters and catalyst carriers for use for exhaust gas purification in internal combustion engines such as diesel engines, and gasoline engines; parts of generating apparatus; electronic parts such as substrates, and capacitors.

EXAMPLES

The invention is described in detail with reference to the following Examples; however, the invention should not be limited to these.

Example 1

A precursor mixture was obtained by mixing 38.1 parts by mass of a titanium (IV) oxide powder [available from E.I. DuPont de Nemours and Company "R-900"], 52.5 parts by mass of an α-alumina powder [available from Sumitomo Chemical Co., Ltd. "AES-12"], 5.7 parts by mass of an magnesia spinel powder, and 3.7 parts by mass of a feldspar powder [Fukushima Feldspar, $SiO_2$-equivalent content of silicon was 72% by mass, $Al_2O_3$-equivalent content of aluminum was 15% by mass].

The precursor mixture was put into an alumina crucible, and fired by heating it up to 1100° C. in air at a heating rate of 300° C./hour, keeping at from 1100° C. to 1350° C. for 5 hours, and further heating it up to 1430° C. at a heating rate of 300° C./hour and keeping it at the temperature for 3.75 hours, and a fired body of aluminum magnesium titanate was obtained.

Figure 2:
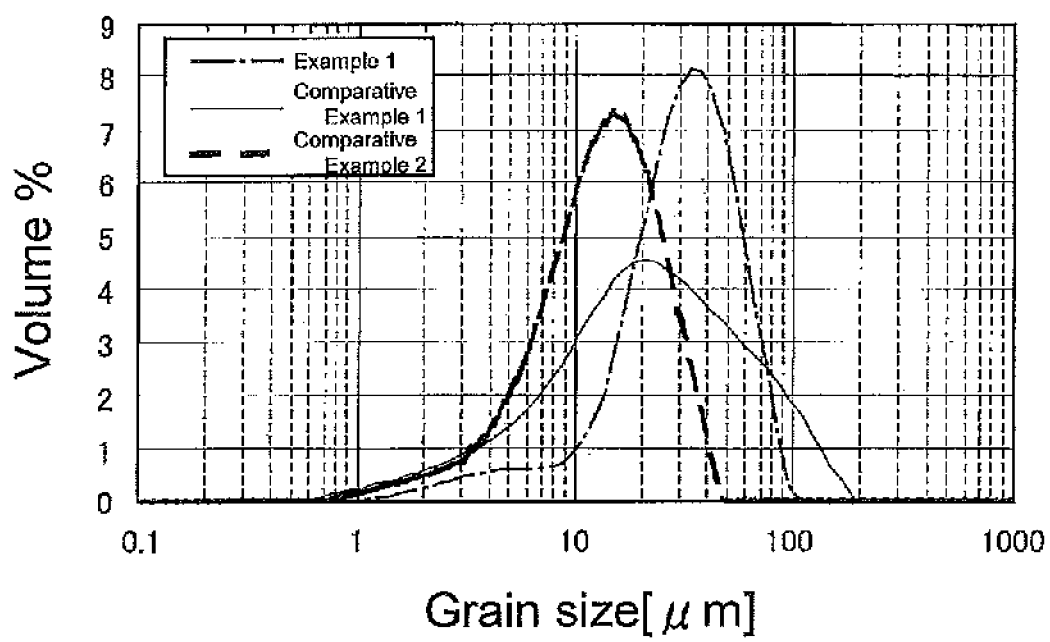
FIG. 2 is a spectrum of a grain size distribution of the powders of aluminum magnesium titanate obtained in Example 1, Comparative Example 1, and Comparative Example 2.

Next, the fired body of aluminum magnesium titanate was pulverized and classified using the pulverizing apparatus with a built-in classifying machinery having the constitution shown in FIG. 1 (ACM Pulverizer, available from Hosokawa Micron, "ACM-10") under the condition that the number of rotations of the pulverizing rotor was 3000 rpm, the number of rotations of the classification rotor was 2000 rpm, the flow rate of gas (air) was 15 Nm$^3$/min, and a powder of aluminum magnesium titanate was obtained. The grain diameter characteristic of the obtained powder of aluminum magnesium titanate was shown in Table 1. The grain size distribution spectrum was shown in FIG. 2. In addition, the grain diameter characteristic shown in Table 1 and the grain size distribution spectrum shown in FIG. 1 were measured by using Sysmex's "Mastersizer2000".

Example 2

A powder of aluminum magnesium titanate was obtained in the same manner as in Example 1, except that, the keeping time at from 1100° C. to 1300° C. was 6.7 hours. The grain diameter characteristic of the obtained powder of aluminum magnesium titanate was shown in Table 1.

Example 3

A powder of aluminum magnesium titanate was obtained in the same manner as in Example 2, except that, the number of rotations of the pulverizing rotor was 6800 rpm. The grain diameter characteristic of the obtained powder of aluminum magnesium titanate was shown in Table 1.

Comparative Example 1

At first, a fired body of aluminum magnesium titanate was obtained in the same manner as Example 2. Next, the fired body of aluminum magnesium titanate was pulverized by using a stone mill (Premax "PR-200V", available from Chuo Kakohki Shoji) under the condition that the teeth clearance was 90 μm, and the number of rotations was 2000 rpm, and a powder of aluminum magnesium titanate was obtained. The grain diameter characteristic of the obtained powder of aluminum magnesium titanate was shown in Table 1. The grain size distribution spectrum was shown in FIG. 2.

Comparative Example 2

At first, the same precursor mixture as that used in Example 1 was put into alumina crucible, and firing by heating up to 1100° C. at the rate of 300° C./hour in air, keeping at from 1100° C. to 1300° C. for 2 hours, and further heating up to 1450° C. at the rate of 300° C./hour, and keeping at the temperature for 4 hours, and a fired body of aluminum magnesium titanate was obtained.

Next, the fired body of aluminum magnesium titanate was pulverized and classified by using the above-mentioned pulverizing apparatus with a built-in classifying machinery under the condition that the number of rotations of the pulverizing rotor was 6800 rpm, the number of rotations of the classification rotor was 2000 rpm, and the flow rate of gas (air) was 15 Nm$^3$/min, and a powder of aluminum magnesium titanate was obtained. The grain diameter characteristic of the obtained powder of aluminum magnesium titanate was shown in Table 1. The grain size distribution spectrum was shown in FIG. 2.

Comparative Example 3

A powder of aluminum magnesium titanate was obtained in the same manner as in Comparative Example 2, except that, the number of rotations of the classification rotor was 500 rpm. The grain diameter characteristic of the obtained powder of aluminum magnesium titanate was shown in Table 1.

Comparative Example 4

A powder of aluminum magnesium titanate was obtained in the same manner as in Comparative Example 2, except that, the number of rotations of the pulverizing rotor was 4000 rpm. The grain diameter characteristic of the obtained powder of aluminum magnesium titanate was shown in Table 1.

Comparative Example 5

A powder of aluminum magnesium titanate was obtained in the same manner as in Comparative Example 2, except that, the number of rotations of pulverizing rotor was 3000 rpm. The grain diameter characteristic of the obtained powder of aluminum magnesium titanate was shown in Table 1.

TABLE 1

| | Median grain diameter (μm) | Fine particulate component having a grain diameter of 10 μm or less (volume %) | Coarse particulate component having a grain diameter of 70 μm or more (volume %) | Presence or absence of coarse particulate component having a grain diameter of larger than 110 μm |
|---|---|---|---|---|
| Example 1 | 31.5 | 8.3 | 4.0 | absent |
| Example 2 | 29.7 | 8.7 | 2.2 | absent |
| Example 3 | 20.1 | 17.2 | 0 | absent |
| Comparative Example 1 | 26.4 | 18.5 | 11.9 | present |
| Comparative Example 2 | 13.4 | 33.4 | 0 | absent |
| Comparative Example 3 | 14.1 | 31.2 | 0.4 | absent |
| Comparative Example 4 | 17.4 | 26.0 | 0 | absent |
| Comparative Example 5 | 17.3 | 28.9 | 1.0 | absent |

In Examples 1 to 3, all the elements of the invention were satisfied, the formation of a fine particulate component and coarse particulate component of the obtained powder of aluminum magnesium titanate was inhibited. In addition, the tendency that a fine particulate component increased with an increase in the number of rotations of the pulverizing rotor was observed.

Meanwhile, Comparative Examples 1 to 5 were examples that any of the elements of the invention was not satisfied. In Comparative Example 1, fine particulate component and coarse particulate component increased, since classifying was not carried out although the keeping step was adjusted properly. In Comparative Examples 2 to 5, fine particulate component increased, since the keeping time in the keeping step was short.

The mode and Examples for carrying out the invention disclosed at this time are exemplification in all aspects, and those should be considered unlimitedly. The scope of the invention is indicated by the claims, not by the above-mentioned description, and is intended to comprise all variations in the meaning and in the range of claims-equivalent.

EXPLANATION OF REFERENCE

100 main body
101 gas introduction port
102 discharge port 103 cylindrical body
104 inlet port
200 pulverizing area
201 pulverizing rotor
202 pulverizing hammer
203 liner
300 classification area
301 classification rotor
302 classification fan

The invention claimed is:

1. A process for producing a powder of aluminum titanate-based ceramics, comprising a step of keeping a precursor mixture containing a titanium source powder, an aluminum source powder and a silicon source powder at a temperature range of from 1100° C. to 1350° C. for 3 hours or more,
  followed by a step of heating the precursor mixture up to a temperature of 1400° C. or more and thereafter firing, at this temperature, the precursor mixture after the keeping to obtain a fired body of aluminum titanate-based ceramics, and
  a step of pulverizing and classifying the fired body of aluminum titanate-based ceramics,
  wherein the step of pulverizing and classifying comprises;
  a step (A) of pulverizing the fired body of aluminum titanate-based ceramics with the application of an impact and classifying the pulverized ceramics to obtain a powder of aluminum titanate-based ceramics having a prescribed grain diameter or less, and
  a step (B) of re-pulverizing the rest of the pulverized ceramics with the application of an impact and classifying the obtained pulverized ceramics to obtain a powder of aluminum titanate-based ceramics having a prescribed grain diameter or less.

2. The process according to claim 1, wherein the step (B) is repeated twice or more.

3. The process according to claim 1, wherein the step (A) and the step (B) are carried out continuously by immediately classifying and discharging the powder of aluminum titanate-based ceramics having a prescribed grain diameter or less obtained by the pulverizing out of a pulverizing area and at the same time, continuing pulverizing of the rest of the pulverized ceramics existing in the pulverizing area.

4. The process according to claim 1, wherein the step of pulverizing and classifying is carried out by using a pulverizing machine with a built-in classifying machinery.

5. The process according to claim 1, wherein a maximum grain diameter of the powder of aluminum titanate-based ceramics having a prescribed grain diameter or less is 110 μm or less.

6. The process according to claim 1, wherein the precursor mixture further contains a magnesium source powder.

7. The process according to claim 6, wherein the titania-equivalent amount of the titanium source powder to be used is 20 parts by mass or more and 60 parts by mass or less relative to 100 parts by mass of the total of the titania-equivalent amount of the titanium source powder to be used, the alumina-equivalent amount of the aluminum source powder to be used, and the magnesia-equivalent amount of the magnesium source powder to be used.

8. The process according to claim 6, wherein the alumina-equivalent amount of the aluminum source powder to be used is 30 parts by mass or more and 70 parts by mass or less relative to 100 parts by mass of the total of the titania-equivalent amount of the titanium source powder to be used, the alumina-equivalent amount of the aluminum source powder to be used, and the magnesia-equivalent amount of the magnesium source powder to be used.

9. The process according to claim 6, wherein the magnesia-equivalent amount of the magnesium source powder to be used is 0.1 parts by mass or more and 10 parts by mass or less relative to 100 parts by mass of the total of the titania-equivalent amount of the titanium source powder to be used, the alumina-equivalent amount of the aluminum source powder to be used, and the magnesia-equivalent amount of the magnesium source powder to be used.

10. The process according to claim 1,
  wherein the precursor mixture is heated up to a temperature of 1400° C. or more and lower than 1500° C. and thereafter fired at this temperature.

11. The process according to claim 1,
  wherein the precursor mixture is kept at the temperature range of from 1100° C. to 1350° C. for 4 hours or more.

12. A powder of aluminum titanate-based ceramics obtained by the process according to claim 1,
  wherein a content of fine particulate component having a grain diameter of 10 μm or less is 20% by volume or less and a content of coarse particulate component having a grain diameter of 70 μm or more is less than 10% by volume.

* * * * *